United States Patent [19]

Braun et al.

[11] Patent Number: 4,891,529
[45] Date of Patent: Jan. 2, 1990

[54] SYSTEM AND METHOD FOR ANALYZING DIMENSIONS OF CAN TOPS DURING MANUFACTURE

[75] Inventors: Paul A. Braun, Simi Valley; Michael W. Ormsby, Thousand Oaks; Gary L. De Zotell, Simi Valley, all of Calif.

[73] Assignee: View Engineering, Inc., Simi Valley, Calif.

[21] Appl. No.: 234,893

[22] Filed: Aug. 22, 1988

[51] Int. Cl.$^4$ ............................................. G01N 21/86
[52] U.S. Cl. ................................... 250/560; 356/376; 413/66
[58] Field of Search .................. 250/223, 560; 413/12, 413/66; 356/376; 358/107

[56] References Cited

U.S. PATENT DOCUMENTS

| | | | |
|---|---|---|---|
| 4,343,553 | 8/1982 | Nakagawa et al. | 250/560 |
| 4,658,633 | 4/1987 | Freer et al. | 24/709.4 |
| 4,710,808 | 12/1987 | Hoogenboom et al. | 356/381 |
| 4,744,664 | 5/1988 | Offt et al. | 356/375 |
| 4,749,273 | 6/1988 | Reinhold | 356/376 |

OTHER PUBLICATIONS

Jackson et al., "The End Spector System for Automated Inspection of Beverage Can Ends", Vision '86 Conference Proceedings, Jun. 3-5, '86.

Primary Examiner—David C. Nelms
Assistant Examiner—Eric F. Chatmon
Attorney, Agent, or Firm—Merchant, Gould, Smith, Edell, Welter & Schmidt

[57] ABSTRACT

A can top measuring system is disclosed, including a rotatable turntable (40) containing can top receiving apertures (44). The turntable (40) may also be translated in either the X or Y direction. A differential height sensor (50) surrounds the can top (70) in order that two laser ranger finders (51,52) may emit beams toward opposite sides of the can top (70), the reflected beams being sensed by two dimensional detector arrays (58, 60). Height measurements can also be accomplished by an autofocusing optical system (28) movable along the Z axis. A score line (76) depth in the can top (70) may be measured by observing the characteristic sinusoidal variation (94) of a beam (93) scanned transversely across the score line (76). A node (96) resides on the score line (76) centerline (95), which can thus be scanned as reprsentative of the deepest portion (91) of the score line (76).

31 Claims, 5 Drawing Sheets

SYSTEM AND METHOD FOR ANALYZING DIMENSIONS OF CAN TOPS DURING MANUFACTURE

BACKGROUND OF THE INVENTION

This invention relates to systems and methods for making measurements in three dimensions of complex objects, and more particularly to methods for making a number of critical measurements of metal can tops at various stages in their formation.

The can top is a particularly illustrative example of the problems involved in three-dimensional measurements of formed products, because of the variety of shapes that are used, and the criticality of certain parameters. Tremendous volumes of these can tops are of course manufactured to meet modern demand, and although the equipment is automatic, wear inevitably results in changes in the formed parts. Thus, as the peripheral edge is curled so as to be properly joinable to a can body, and as the central region is shaped to receive a tab for easy opening, readings must be taken periodically to insure that they are not out of specification. The most critical reading is generally regarded as the depth of the score line which is ruptured as the can top is opened with the pull tab. However, this reading is difficult to obtain with a relatively simple but reliable mechanism, inasmuch as the compressive knife edge which forms the score line leaves an irregular pattern, with slanted sides and sometimes with undulations or small protrusions on the bottom surface, and this shape changes as the compressive knife edge wears.

In addition, readings must be taken of a number of salient features during the process of can top formation. These include the outer dimension, the progressively curled peripheral lip, the thickness of the principal panel, the height of an interior ridge at the periphery, the dimensions of a central bubble which is converted into a shaped button, various dimples and depressions, and the thickness and size of the rivet to which the tab is attached. The need for these and other measurements are described in an article entitled "The EndSpector TM System for Automated Inspection of Beverage Can Ends" by Robert L. Jackson et al, presented at the Vision 1986 Conference on June 3-5, 1986, and published in the Proceedings. This system may be the first automated system for making dimensional measurements, since prior to that time and still today many organizations engaged in can top manufacture employ manual, contact-type gauges with the attendant difficulties of inaccurate readings, costly and laborious procedures, the need for many technicians, and the difficulty of compiling the statistical information. An automated system, as pointed out in the article, has the further advantage, however fast it is, of generating data in a form which can immediately be processed and analyzed. The article identifies 13 different measurements for critical parameters, and states that the tear-open score and the tab opening rivet are the most critical parameters since they, along with the rivet diameter, determine whether the can end will open easily but that leakage will not occur. The system described in the referenced article uses machine vision equipment modified and extended for the particular purpose. Thus, in order to make the 13 critical measurements, a combination of five cameras is used, comprising four vidicons and one CCD camera, together with five separate circuit boards for digitizing, storage and processing of image data from the different cameras, three frame-buffer units, a high-speed numeric processor for providing low-level image processing operations, and a host computer with high speed, floppy disk and hard disk storage systems.

The assignee of the present invention has for a number of years been manufacturing machine vision systems for imaging analysis and dimensional measurement of a variety of parts, most often integrated circuit elements or units which must be analyzed for critical parameters. In such systems, an X,Y stage on a massive reference table is computer controlled while a Z-axis camera looks at a part positioned on the X,Y stage and generates image signals which are digitized and then analyzed, as by correlator or template machine techniques, to identify a part, determine precise position, make critical measurements and the like. By computer control of the mechanism, and by the use of autofocusing to measure height, relative dimensions in three axes may readily be determined. However, obtaining measurements of the critical parameters in a can top is not readily amenable to handling by this system, because of the problems of certain measurements, and certain practical considerations. For example, thickness dimensions at critical areas, such as the score residual (or web) and the rivet residual are not ascertainable simply from the Z-axis camera, and the small size and variables involved preclude accurate measurement by machine vision techniques. Angles of curvature, complex shapes and other factors also mean that the image detected by a video camera may be of very low contrast in a critical region, so that accurate measurements are not readily feasible. Furthermore, the costs involved in using correlation and template matching techniques should be avoided if possible in obtaining the significant measurements. Some of the practical considerations reside in the fact that delivery and location of partially finished and completely finished can tops should not require much mechanical handling or costly equipment, despite the fact that different manufacturers will desire different measurements, and also despite the fact that some can tops are of substantially different sizes than others. In the United States there are two basic configurations, but in other countries different shapes and therefore sizes and configurations are used. Also, as a practical matter it should not be required to achieve precise, accurate positioning of the can tops during the measurement process, since this would delay operations and impose additional costs. The "EndSpector TM" system includes, for this purpose, a stacker, loading robot in the form of a 5-axis pick and place device with a special end effector which holds can ends, and a multi-access positioning system for presenting the can end to the cameras and light sources rigidly fixed on a granite base. In order to make the needed measurements, not only are five cameras used, but also special "structured light sources" which are used in various combinations to provide illumination as needed for the particular situation.

With respect to the critical score residual and rivet residual measurements, the "EndSpector TM system" utilizes two high-resolution cameras and the set of structured-light sources to obtain differential readings of using small fields of view. Each of the structured light sources projects a line pattern onto the image, and the line is placed across the score and appears to be offset, at the score depth, by a given amount. The camera image is used in measuring the extent of the offset, and because the light source and the camera have fixed positions relative to each other, the position of the surface at the offset region can be determined, and from this the differential measurement of score or residual thickness can be computed. In order to achieve the necessary precision, the cameras must not only be high resolution cameras but the field of view is limited to approximately 0.02 inches, requiring considerable magnification. Interpretation of the image requires exercise of a correlation function, which substantially increases the cost and complexity of the system.

Clearly a system based on the assignees's pre-existing machine vision system would be far less costly and complex than the "EndSpector TM" system, if the needed measurements can be provided.

SUMMARY OF THE INVENTION

Systems and methods in accordance with the invention dispose parts to be measured in different manners on an XY stage movable relative to a Z axis camera suspended from a stable bridge above a work station surface, with the parts being held in a rotary table which can be turned so as to present the part to be measured or analyzed in different angular positions relative to the X and Y axes. The system includes means for autofocusing the View camera by changing its position on the Z axis, and means for identifying the positions of movable the members in X, Y and Z, while controlling the positions automatically so as to present images in any desired sequence. In addition, thickness measurements are made by a pair of spaced apart optical measurement devices, one on each side of the parts being measured, which can be scanned in the X,Y plane in a direction across the part. The optical sensing arrangement directs a beam of light obliquely against opposed surfaces on opposite sides of the part, the reflections being directed toward sensors which are capable of measuring deflection in two orthogonal directions. By analyzing time varying signals obtained from the two sensors, the differential reading of the thickness of the part at a crucial location is accurately determined. The system and method are not required to use correlation techniques or extensive image analysis procedures.

An example of a system in accordance with the invention, as applied to measurement of different can tops for different parameters during a succession of formation steps, begins with the partly or fully finished can tops being placed in pockets in a rotary table on the X,Y stage of a machine vision system. Such a machine vision system typically has position control and data processing systems for digitizing, storing and analyzing images in accordance with the location of critical contrast positions as represented in the image. A Z axis camera including means for superimposing a periodic light image on the can top is movable along the Z axis, and is associated with means for analyzing the derived signal so that when precise focus is obtained the position of the camera means indicates the Z axis position of the surface under analysis. The part is generally illuminated coaxially through the camera optical system, but additionally may be illuminated obliquely from one or both sides for better contrast. The rotary table includes reference surfaces at the top of the table and, within each pocket, a receiving lip on which the can periphery may be placed. Below the rotary table on the opposite side from the camera and the illuminating means, in fixed relation to the support for the rotary table, is disposed a retroreflecting surface which provides more contrast in determining can end position. By placing inserts in the pockets for receiving can tops, different sizes or styles of can tops may be received. The can tops are also scanned, separately, by a pair of opposed optical beam devices having means for generating beams of finite with directed toward opposed positions on opposite sides of a can top, and at oblique angles, the beams being reflected toward two-dimensional multi-element detector devices. These detector devices provide signals to data processing circuits. As the sensor scans transversely across a critical area, variations in the location of the deflected beams in two dimensions are used to compute the thickness of the can top in a predetermined region. The score line is not uniform in shape and its center cannot be precisely determined by a beam of finite diameter as if scans across the bottom. However, by sampling the signals derived in both of the orthogonal directions, if is found that there is a transverse deflection which follows a characteristic approximately sinusoidal pattern that enables precise location of the center, and there high resolution determination of the depth of the score bottom.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
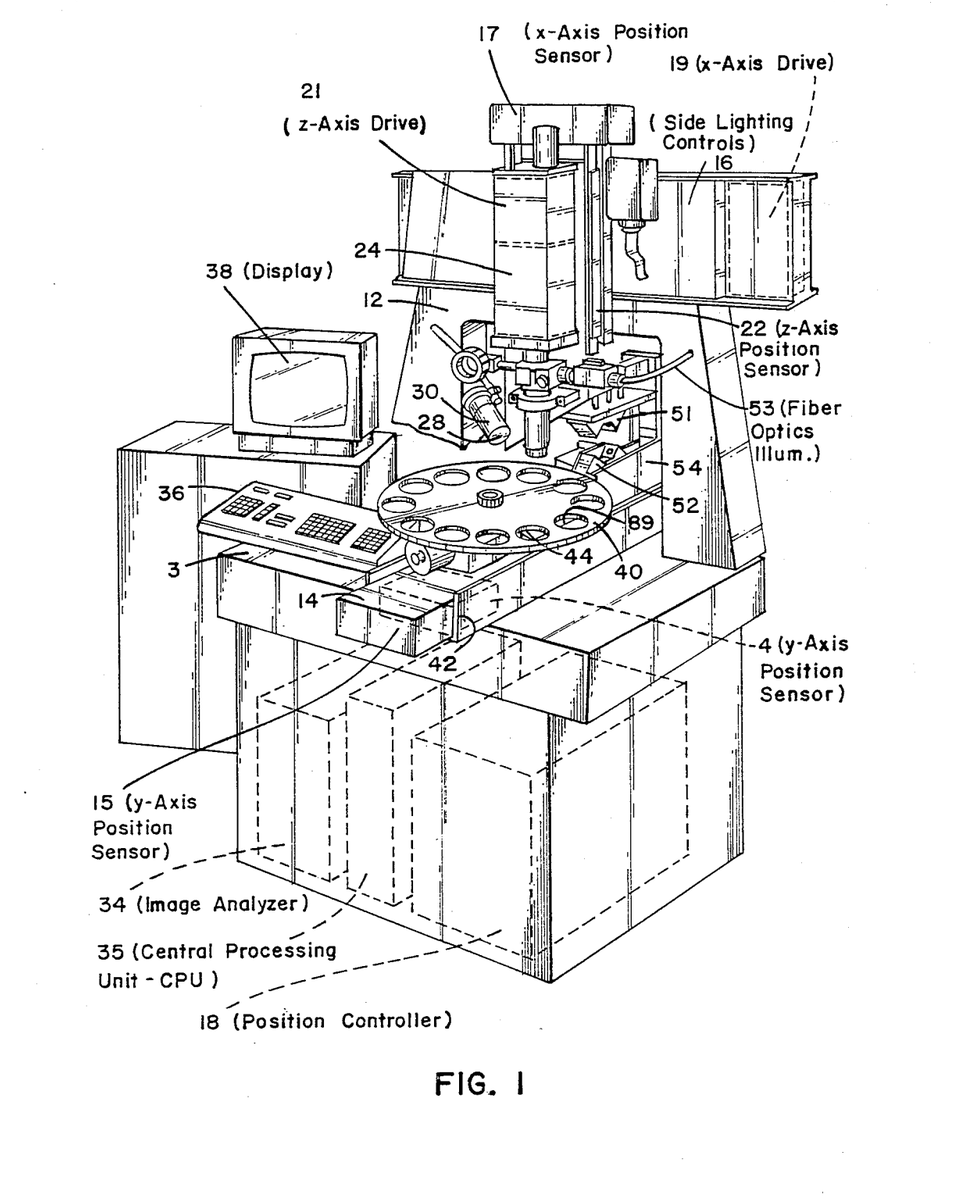
FIG. 1 is a generalized perspective view of a system in accordance with the invention as depicted for use in the analysis of can tops during stages of formation.
Figure 2:
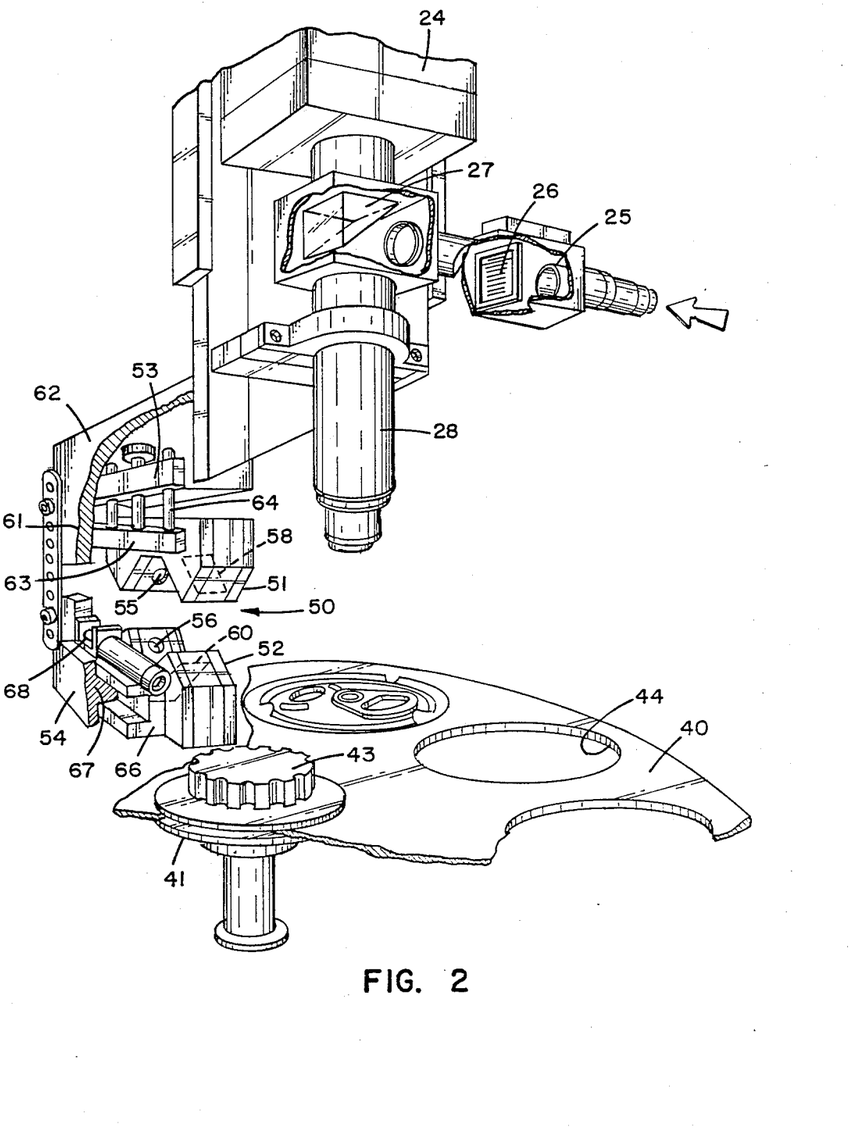
FIG. 2 is a perspective view, partially broken away, of a part of the system of FIG. 1 showing a differential height sensor, optical system and can top transport system.

The principal elements of a system in accordance with the invention are shown in FIGS. 1 and 2 and comprise a mechanically stable base 10 and bridge 12, the bridge providing a support for a viewing mechanism and optical sensing system 1 that is mounted above a horizontal working surface area 2 in which parts to be measured are disposed above the base. On the upper surface 3 of the base 10, a Y axis movable table 14 including a conventional drive 4 provides a variable Y axis position as well as a support and positioning mechanism for the parts being measured, here can tops for aluminum cans. A precision scale, such as a Heidenhghn scale, is disposed along the Y axis path for sensing the position of the Y axis table 14, the scale comprising a part of a Y axis position sensor 15 of known configuration. An X axis carriage 16 is mounted to traverse the overhead bridge 12 in the X axis direction and includes a conventional drive 19. An X axis position sensor 17, shown only schematically, is mounted along the X axis carriage 16 for providing signals precisely representative of position. A position control system 18, which may be a separate processor or a part of a central processor unit 35, operates to actuate the Y axis table 14 and the X axis carriage 16 so as to shift parts into view at different relative positions on the working surface plane.

The Z axis carriage 20, including an internal drive 21 and an associated Z axis position sensor 22, is mounted on the X axis carriage over the working surface, and supports a downwardly directed video camera 24 which defines the Z axis for the system. The position control system 18 also operates the Z axis drive 21 to position the video camera 24 in the autofocussing mode. The video camera 24 preferably includes a side mounted spatial light source 25 which directs light through a periodic pattern 26 onto one facet of a beam splitter 27 which is disposed in the optical path defined by an optical system 28 between the camera 24 and the working surface below it. This arrangement projects a periodic light pattern to illuminate the object under examination, the light pattern including bars transverse to the scanning direction of the camera 24, which introduce a periodicity into the scanning signal that in effect generates artificial surface information in the image signal derived at the sensor. As described in issued U.S. Pat. No. 4,743,771 to Weisner et al, the presence of a periodic component in the scanning system enables autofocusing to be carried out more precisely, and independently of the surface characteristics of the product being imaged. Typically, the collinear illumination achieved through the optical system will suffice for most measurements, but where special illumination is required it is provided by first side light 30, and a second side light (not shown) which comprise light sources mounted on brackets to be movable with the camera and to be directed onto the working surface at the focal point of the optical system 28.

Signals from the position sensors 15, 17 and 22, and from the video camera 24 are provided to an image analyzer computer 34 which controls the sequence of tests to be run, digitizes and stores the image information to identify significant transitions by contrast variations in the signal. A central processing unit 35 performs various functions such as computation of dimensions, storage of reference valves, data logging, program entry, etc. The routines utilized for each individual measurement, apart from measurement of thicknesses and residuals, are in accordance with techniques developed for the View 1200 system, and used for many years in precision applications for the semiconductor and other industries. The system includes a keyboard 36 by which an operator can enter designations for various sizes and types of can tops, and the measurements to be made, as well as sequencing information, and a cathode ray tube display 38 on which may be presented a display of the image sensed by the video camera 24.

Figure 3:
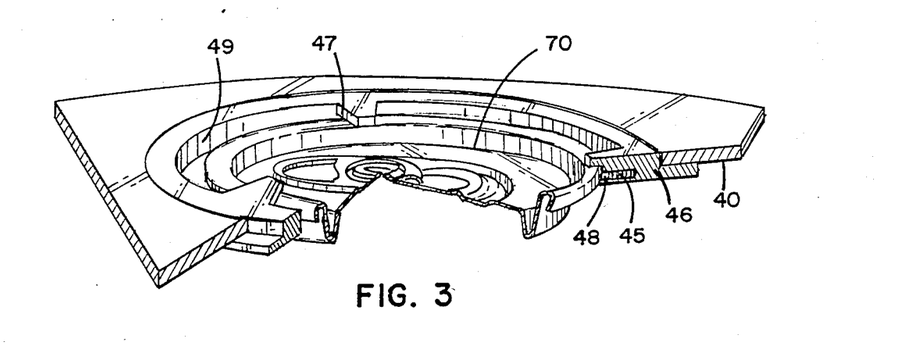
FIG. 3 is an enlarged perspective view of a fragment of a can top mounted in an insert in a rotary table employed in the system of FIGS. 1 and 2.

The working surface for optical inspection is principally defined by the upper surface of a rotary table 40 mounted on the Y axis table by insertion of spindle 41 and is thoroughly secured by a hold down knob 43. A table drive 42, which may be an incremental stepping motor or a D.C. motor, is operated by the position control system 18 to select particular parts, and areas of parts, for viewing by the scanning system and other devices. The table 40 includes regularly spaced apertures or pockets 44 at a predetermined radius from the center axis, the pockets 44 being slightly larger than the sizes of the cans, and receiving ring inserts 46. Each ring inserts 46 includes a number of spaced apart tabs 47, emanating from its inner periphery 49, for the upper surface of the part 70. A shoulder 48 below each tab 47 engages the peripheral edge of a part 70, such as a can top, spring operated ball plunger 45 extending from the shoulder 48 seats the part in place. By use of the inserts 46, which are fabricated to receive different sizes and types of can tops at different steps in their fabrication process, the system is freed from the need for a high precision insertion and removal device as well as a precision positioner. The rotary table can however be supplied with parts to be measured by a feeder mechanism (not shown) and these can be removed by an automatic pickoff mechanism (also not shown) after measurements are complete.

The Z axis carriage mechanism 21 supports a differential height sensor 50 which is mounted to be pass on opposite sides of the rotary table 40 when if is moved along the X axis in the rearound direction as seen in the Figures. The differential height sensor 50 comprises a pair of horizontal extending arms, an upper arm 53 being above the plane of the working surface and extending in a horizontal direction, while the lower arm 54 is parallel to the upper arm but extends below the working surface plane. The differential height sensor 50 further comprises an upper laser range finder 51 and a lower laser range finder 52. Precise vertical positioning of the upper laser range finder 51 on the supporting mechanism is achieved by adjusting a fine pitched screw 61 rested in an upper bar 62 which is attached to the upper arm 53. A lower horizontal bar 63. Attached to the upper laser range finder 51 is attached to the lower bar 63 and a pair of spaced apart guide pins 64 assure parallelism between bars 62 & 63, as relative position is changed.

The lower laser range finder 52 is horizontally rather than vertically adjustable, being supported from a "U" shaped carriage 66 which is horizontally movable along a tongue 67 which is fixed to the lower arm 54. A horizontal fine pitched screw 68 adjustable from one end is seated in a bracket 69 fixed to the lower arm 54. The screw 68 passes through an upstanding position of the "U" shaped member 66 so that the screw 68 can be adjusted to change the horizontal position of the lower laser range finder 52 by moving the carriage 66 on the tongue 67.

A first light source 55, typically a solid state laser (although any light source having a fine, collimated beam will suffice) is directed at an oblique angle toward the upper side of the working surface, while a second light source 56 of the same character is directed upwardly at an oblique angle to the under side of the working surface, the light sources 55, 56 being positioned along the X axis so that they impinge on opposite surfaces of a part at the same X axis position. The position screws 62, 68 are set so that summitry is also achieved in the Z and Y axis as well. The beams from the light sources 55, 56 are reflected off the part toward first and second detector arrays 58, 60 respectively on the respective upper and lower arms 53, 54. The detector arrays 58, 60 are disposed at angles to receive the reflected light beams, at locations determined primarily by the distance of the reflecting object from the light source, as well as the angle of the surface relative to the angle of the light beam. A laser ranging sensor of this type that is preferred in this example is the CyberOptics Prs-30 manufactured by CyberOptics Inc. of Minneapolis, Minn. The detector array has a two-dimensional characteristic, with 512 pixels in the vertical (range measurement) direction and 64 pixels in the horizontal (transverse deviation) direction. The light beam has a spot size of approximately 0.4 mils, and focusing elements (not shown) may be incorporated between the collimated light source and the detector array in each instance. From this example, the angle of obliquity is approximately 45 degrees between the angle of the light beam and the horizontal plane.

Figure 4:
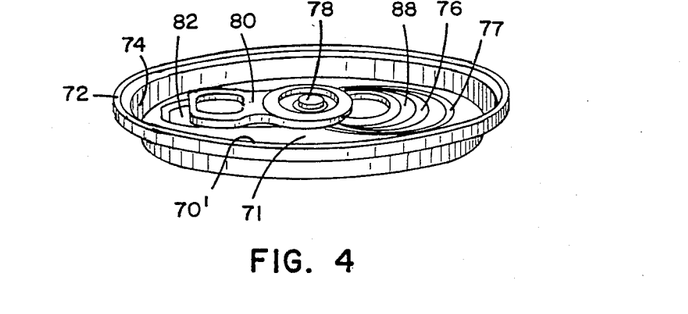
FIG. 4 is a fragmentary perspective view of a different can top, showing the principal features thereof.
Figure 5:
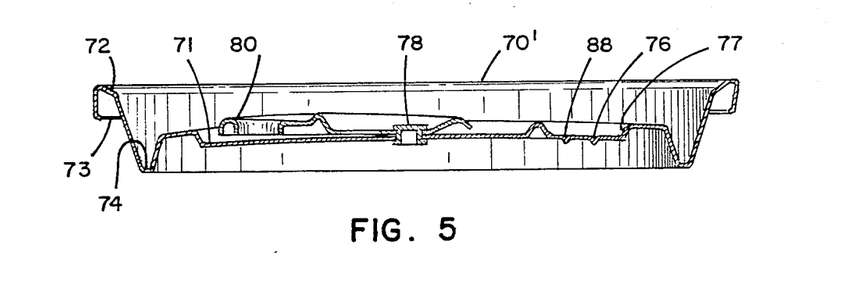
FIG. 5 is a cross-sectional view of the can top of FIG. 4.

As seen in FIGS. 4 and 5 a finished can top 70', is shown that is of a different type than is seen in FIG. 3. The can top 70, has a central web or panel 71, and a peripheral lip 72 which turns inwardly at a curl 73. Adjacent the lip 72 is a downwardly depending bottom ridge or gutter 74 which joins the panel 71 comprising the central body of the can top 70. In formation of the can, during successive processing steps, the lip is formed tentatively first, and its height must be usually ascertained, before the curl 73 is added in.

The central portion of the panel 71 is first formed into a dome of relatively large diameter, then a bubble or nipple of smaller diameter but greater height measured is first formed. The nipple is ultimately formed by flattening the top of the central nipple into a rivet 78, seen in FIG. 4 and 5, in the center of the panel 71. The nipple is usually measured for height and diameter during the formation of the can top, since proper intermediate dimensions are needed to form a secure rivet 78 over the pull tab 80. When the rivet 78 is strong enough the pull tab 80 end may be raised to exert a lever action on the panel 71 against an operable portion defined by a score line 76 which forms a loop extending outwardly from the central region. The score line 76 may be surrounded by a strengthening deformation 77 which adds to the stiffness of the panel 71 as force is exerted by the tab 80. This deformation may be in the forms of a raised bead or a depressed surface. A finger well depression 82 is often disposed in the panel opposite the outer end of the tab 80. Different depressions, beads and dimples can be disposed on the surface adjacent the tab 80 for various purposes, but these are not as significant to successful operation as the critical areas which relate to peripheral sealing, tab attachment and frangible score line function.

The major score line 76 may have an adjacent minor score line inside it which is of lesser depth but which yields somewhat as pressure from the tab 80 is exerted due to the lever action on the tab handle, bending the area within the score inwardly and stressing the major score line 76 more heavily so that it will rupture more readily and cleanly.

Figure 6:
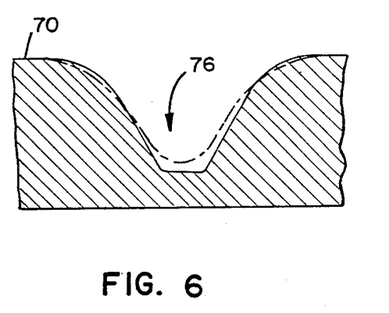
FIG. 6 is a cross-sectional view of a portion of a can top, showing the difference between score lines made by a new and worn cutting edge.

As seen in FIG. 6, the major score line 76, when formed by a newly finished scoring knife, has a clean configuration with sharp angled edges under high magnification. As the score knife wears, however, as seen in dotted lines, the corners become rounded and the score residual has a greater thickness. Although these differences are not visible to the human eye, unaided, they make a crucial difference in the ability to open the can. On the other hand, if the scoring knife is improperly set and makes too deep an impression, the score residual is too thin and the score may rupture in minor or major fashion from internal pressure, handling, or both.

Figure 7:
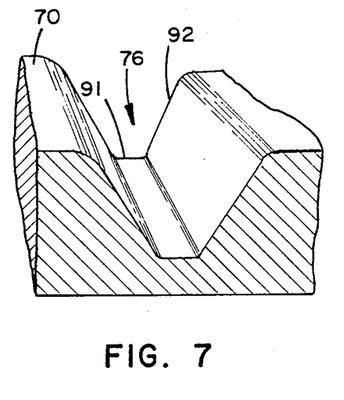
FIG. 7 is a perspective, greatly magnified view of the sides and bottom of a typical score line.

The formation of the can top must be carried out with such precision that the score residual should be accurate to within plus or minus 0.03 mil. This means that the score line residual must be measured to an accuracy of at least 0.1 mil, preferably about 0.060 mil on a statistically repeatable basis. However, as seen in FIGS. 6 and 7, the essentially compressive distortion that takes place when the score line is formed by the scoring knife results, under high magnification, in a significant number of local distortions. The prior walls are not flat sided but instead have an irregular pattern down the slopes. The bottom is not flat but has modes, undulations and irregularities which can vary as much as 0.1 mil in height. When trying to secure a high precision reading of score residual with a beam of 0.4 mil spot size. Therefore, these factors present substantial barriers to accurate readings.

Systems in accordance with the invention, however, achieve the necessary precision in all measurements without requiring the use of complex template matching or correlation circuitry, or separate specialized lighting systems for different measurements that are to be made. The basic illumination for the system is provided by the light source 25 adjacent the video camera, which projects the periodic pattern 26, as of a Ronchi ruling, collinearly with the viewing axis, through the optical system 28, via the beam splitter 27. The lines in the Ronchi ruling are transverse to the scanning direction of the video camera 24, so that the reflective surface of the can top 70 has superimposed upon it artificial surface information that aids in automatic focusing, as described in U.S. Pat. No. 4,743,771. Height measurements may thus be taken, knowing the fixed focal length of the optical system, by deriving the position of the Z axis carriage 20 using the Z axis sensor 22, when the video camera 24 has been focused on a given surface: X and Y measurements are taken by using the image analysis capability of the image analyzer computer 34 to discern a selected contrast region, such as the edge of a can top, and deriving the X and Y coordinates of the edge at that point. For this purpose, when the Y axis table 14 is driven to a given position and the X axis carriage is also positioned, the corresponding position sensors 15, 17, provide precise indications of such positions and further relative displacements in the field of view on the image can be compensated for by the image analyzer 34. The system operates solely with binary, non-grey scale readings, digitizing and storing the images presented but operating solely into response variations in contrast and without requiring complex template matching or correlation techniques. Using the CRT display 38 and the keyboard 36, an operator can preprogram any particular sequence of measurements for a can top in one of its stages of formation, taking into account the different types of can tops that may be analyzed. For this purpose, the operator can identify the can top type and stage of processing with a code number, use the key pad to position the can top 70 with a particular image in the field of view on the display 38, and enter the calculation to be made. For example, in the usual situation the system takes a reading at a first location, shifts to the approximate location where the second reading is to be taken, and then, based upon the contrast in the image, locates the second surface precisely, entering the coordinates or Z axis position and computing the desired reading from the two values, for entry into storage and later statistical analysis.

As one example, the inserts 46 (FIG. 3) for the appropriate can top styles are placed in the pockets 44 in the rotary table 40, the inserts 46 being selected for the particular stage and can top style. The radially inward tabs 47 with underlying shoulders 48 and the ball plungers 45 support the can tops 70 with a close fit. Reference readings may be initially taken, to provide precise position information. One reference user of a series of readings of edge position of the can tops 70 to locate by computation the actual center position on the insert 46. This relieves the operator of the duty of precise location of the can top, or the usage of a complex 5-axis positioning system. A different reference reading is taken of the upper surface of the of insert 46, for use in making the height readings. To aid in reading the outside can dimension, the upper surface of the support under the rotary table 40 includes a retroreflective material 89 under the pockets 44. The retroreflective material 89 to directly returns light along the optical axis back toward the video camera 24. Since light falling on the can top 70 is reflected with a given intensity, while light reflected off the retroreflective surface 89 is of much higher intensity, high contrast definition of the edge of the can top is provided. The inner diameter of the insert 46 is displaced from the outer diameter of the can top 70, providing a gap to permit light to pass through to the retroreflective surface 89.

Figure 8:
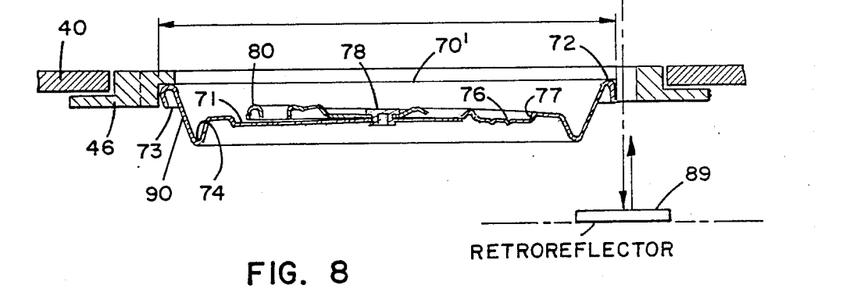
FIG. 8 is a simplified diagram of the manner in which lateral dimensions are measured.

Can tops to be positioned for analysis during one or more stages of fabrication can be mounted in the series of pockets in serial order, or taken from different machines at the same stage of processing, or in any order desired. The can tops can be inserted on annually, or by an automatic pick and place machine (not shown). All samples may be placed right-side up in the inserts and viewed in this position 46, or the entire rotary table 40 may be inverted. As seen in FIG. 8, lateral dimensions are measured by positioning a given edge or surface under the optical axis, and using the sensors 15, 17, and 22 to provide position data to the image analyzer 34. Taking two different readings of appropriate points in X and Y the lateral dimension can then be calculated by conventional means. Other lateral dimensions can be found in related manner, based upon available data is needed. If, for example, the curl 73 minimum opening diameter is to be measured, the can top 70 is viewed in inverted position. The X,Y position of the curl edge and is sensed by finding the variable contrast optical image of the edge. The opposing wall surface 90 immediately opposite the curl edge is calculated from the center position, since the transverse dimension is known and does not vary substantially in comparison to the curl. The taper on the wall generally precludes reliable measurement using optical contrast. For better contrast in determining curl edge position, one of the side lights 30 may be energized to provide a shadow effect.

Figure 9:
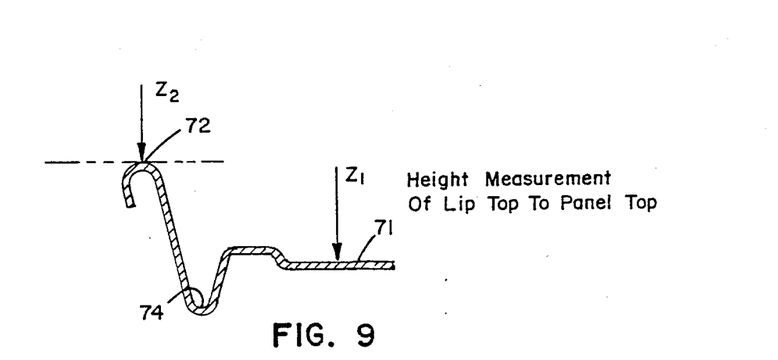
FIG. 9 is a simplified diagram of the manner in which height dimensions are measured with the camera system.

For height readings, the autofocus capability and the Z axis position sensor 22 are used as seen in FIG. 9. For the height of the lip 72 and depth of the gutter 74, four different readings are taken. For the height of the lip, above the panel 71 the measurement is between the top of the tab 47, from the known dimension of which the top of the lip 72, can be calculated. The top of the panel 71 can be measured directly on the Z axis. For the gutter 74 the measurement is between the bottom of the gutter 74 and the surface of the panel 71. (Here the bottom of the gutter means the upper surface of the lowest point of the gutter).

In the formation of the rivet 78, the height of the initial dome relative to the panel 71 may be measured, and then the height of the subsequent nipple and, if desired, its diameter, may also be measured. After the tab 80 is in place, the diameter of the rivet 78 that is formed above the tab 80 may also be measured.

However, as noted, the more critical dimensions pertain to the thickness of the rivet residual, and the thickness of the score residual, as seen in FIGS. 4 and 5. For these dimensions and for the thickness of the panel 71 after the formative steps have been completed, a cooperative sensing system is used. The machine vision system can identify the location of the score line 76 approximately, but cannot identify the center of the score line with anywhere near the degree of exactness desired. Similarly, it can locate the position of the rivet, but cannot identify the thickness of the rivet 78 even if the finished unit is inverted, because the access area available is insufficient for viewing and because it is uncertain that the rivet top will be seated firmly in any reference position. Consequently, the system incorporates an adjacently mounted differential range finding or height sensor system as seen in more detail in FIGS. 1 and 2.

The differential height sensor 50 is linearly movable on the Z axis with the Z axis carriage 20 under control of the position controller 18. It can thus be centered vertically relative to a can top 70 whose vertical position can be ascertained by the height measurement technique described above, focussing on the panel 71. The upper and lower arms 53, 54 respectively on opposite sides of the rotary table 40 are separated by a sufficient distance to span a can top 70 located at the working surface plane. The laser light sources 55, 56 and detector arrays 58, 60 thus can be moved in unison along the Z axis so that these individual sensors are approximately equally spaced relative to the surfaces of the can top from which the light beams will be reflecting. As seen principally in FIG. 2, the angled light beams are directed obliquely against the opposite can top surfaces, as in the score line 76 region, and impinge after reflection onto a correspondingly determined area of the associated detector array 58 and 60. The light beams have a spot size of approximately 0.4 mil while the width of the score line at the bottom 91 is 0.1 mil. The detector 58, 60 arrays have 64×512 sensors in the lateral and vertical directions respectively in this example. From the positions of the points of impingement of the beams on the arrays 58 and 60 the image analyzer 34 and central processing unit 35 thus can compute the individual distances of the can top surface points from the known positions of the light beam sources 55 and 56. Since the separation between these sources 55 and 56 is known, the differential, or the thickness of the element being measured, spacings based upon the detector 58, 60 readings can be computed by known algorithms which are in wide use and need not be set forth in detail.

However, the irregular side 92 and bottom surfaces 91 of the score line 76, as depicted in FIGS. 7, substantially complicate the problems involved in obtaining a score residual reading accurate to substantially less than 0.1 mil. An obliquely angled laser beam 93 can impinge on the sides of the score line 76, reflecting downwardly before being reflected back up toward the detector array 58 or 60. This then will give a false height reading. Also the 0.4 mil beam is substantially occluded from the score line bottom until it begins to clear the upper edge 70 which is 7 mils higher. Thus the reflection off the bottom gradually increases as the beam moves toward full impingement at the center, and thereafter diminishes as the beam edge again reaches the side wall. Although the direct reflection off the bottom will tend to be brighter than ghost images, threshold or amplitude detection is not a feasible basis for discriminating between the different positions. Particularly since the intensity of the beam can vary at different times and under different ambient conditions. Variations in height readings of the bottom of the score line are introduced by nodes, bumps and similar irregularities along the bottom even when a score knife is new. The differential height sensor 50 in accordance with the invention follows a sequence of operations to measure the score residual at the center, typically to better than 0.060 mils accuracy.

Figure 10:
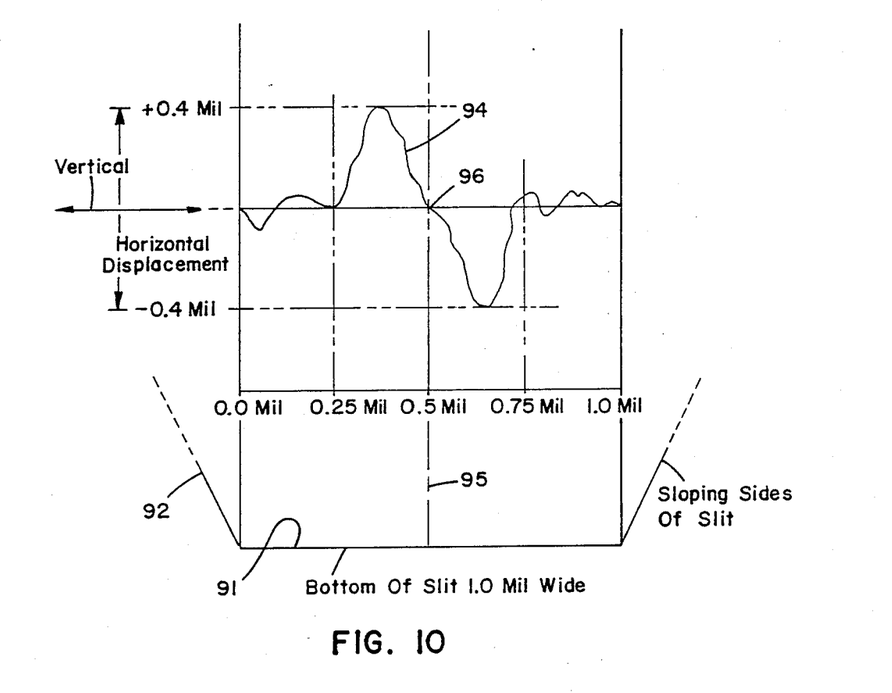
FIG. 10 is a schematic diagram of signal variation occurring in scanning across a score line.
Figure 11:
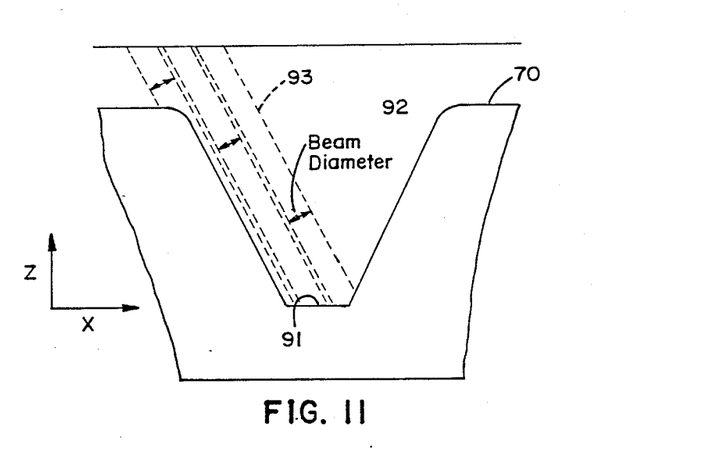
FIG. 11 is a simplified diagrammatic view of the manner in which a beam transverses across a score line.

The can top 70 positioned in the rotary table 40 can be rotated to different positions by angular movement of the rotary table 40. In these positions, achieved by adjustment of the position of the can top on the X and Y axis, and using the knowledge previously derived as to the position of the can top 70 in the pocket, the score line 76 is approximately located by image analysis and position is adjusted until a given segment of score line 76 is perpendicular to the Y axis reference of the height sensor 50. Then as the differential height sensor 50, the score line 76 is scanned across the transversely and signal variations are monitored in both detector arrays 58, 60. Signal amplitude outside the score line region is low and irregular until (see FIG. 11) edge of the beam starts to impinge on the bottom area. Then a substantially greater amount of light energy reaches the detector. The detected signal variation across the bottom is also inconsistent, however, because of the surface irregularities. The variation in the longitudinal direction is however accompanied by a sinusoidal variation 94 in the lateral direction. As the detected signal rises in amplitude, the beam deviates laterally in an irregular but generally sinusoidal fashion in a half wave until the center line 95 is reached. At the center the beam has substantially no lateral deflection but as it passes further it deviates again in an approximately sinusoidal half wave in the opposite sense until the edge of the score line 76 is reached and the signal intensity diminishes. As seen in FIG. 10, this approximately sinusoidal variation provides an excellent correlation with center line position, to augment the height variation detected in the longitudinal direction of the array 58 or 60. The deviation is consistently seen in can tops of different designs but is not fully understood. It is surmised that the beam reflections off the score line region vary oppositely, when there is only partial impingement, when passing the near side boundary in comparison to the far side boundary.

The calculation of the score residual is made by taking the two rangefinder readings, R1 and R2, and determining the valve of K-R,-R2, where K is a constant derived by adding the two range valves R1 and R2 for a known thickness, and represents the spacing between the rangefinders 51, 52.

Once the differential calculations have been made as to the spacing between the opposite sides of the can top 70 at the bottom of the score line, greater accuracy is obtained by using the computed score line center and shifting the Y axis position of the score line slightly in transverse directions, so that adjacent points can be measured for score line residual on each side of the first located position. Consequently, waviness and small bumps in the bottom of the score line can be averaged out and readings of an accuracy of 0.030 mil have often been achieved.

The minor score line, if one is used, can also be measured for residual thickness, but this is typically not necessary. It is more important to measure the thickness of the rivet 78 residual by passing the height sensor 50 across it, at the computed center of the can top 70 position, to obtain the differential measurement that is required. The position of the sensor 50 along the Z axis is adjusted in most applications by taking an initial reading with one laser rangefinder. This assures that the laser sources and arrays on each side have an approximately equal distance from the surfaces on which the light beams are impinging.

The system includes built-in optics for focussing the beams from the light sources to the 0.4 mil footprints and directing the beams, with only limited diffusion, onto the detector array. These are conventional and have been omitted in the Figures for simplicity. It will be appreciated by those skilled in the art that the laser diode is a cost effective and reliable means of generating a suitable precision light source, but that other types of light sources can also be utilized.

Although a number of forms and modifications have been shown it will be appreciated that the invention encompasses all variations and exemplifications in accordance with the appended claims.

What is claimed is:

1. A system for making precision measurements of different parameters of a metal can top as it is progresses through various stages in a manufacturing process involving multiple forming steps, comprising:
   a base having a working area surface and including a bridge spanning across the working area surface;
   stage means movable in X and Y directions in a horizontal plane on the base over the working area surface;
   rotary table means disposed on the X,Y stage means and including means in a number of positions in a horizontal plane for receiving can tops following various forming steps, the rotary table means including drive means for controlling angular position;
   video camera means coupled to the bridge and movable along a Z axis for presenting electronic signals representing an image of the can top at the working surface level;
   data processor means responsive to the electronic signals from the video camera means for providing measurements thereof, the data processor means providing signals to control the positions of the stage means, the video camera means and the angular position of the rotary table means; and
   optical sensing means mounted along the plane of the working surface on opposite sides of the rotary table means for measuring Z-axis dimensions of a can top.

2. The invention as set forth in claim 1, wherein the optical sensing means includes a pair of means providing obliquely directed light beams of finite width against the opposite sides of the can top, and means for sensing the deflection of the individual beams in each of two orthogonal directions.

3. The invention as set forth in claim 2, wherein the data processor system moves the rotary table means to pass a can top between the light beams such that the optical sensing means scans at least one score line on the can top in a direction transverse to the score line which is scanned, the direction of scanning relative to the score line being achieved by rotating the rotary table means.

4. The invention as set forth in claim 1, further including retroreflector means disposed on the stage means below the rotary table means to enhance contrast of the can top image.

5. The invention as set forth in claim 4 above, wherein the system includes means coupled to the video camera means for autofocusing on a region of the can top surface, means for varying the position of the video camera means along the Z axis under control of the data processor means, and means for sensing the position of the video camera means when autofocused from variations in the signals representing the can top image, such that the height of a surface on the can top can be measured.

6. The invention as set forth in claim 5 above, wherein the rotary table means has an upper reference surface and the system includes means for making measurements of surfaces on the can top in relation to the reference surface.

7. The invention as set forth in claim 6 above, wherein the system includes means for providing a video display of the image viewed by the video camera means.

8. The invention as set forth in claim 7 above, wherein the system further comprises light means for illuminating the working area surface coaxially along the "Z" axis; side lights which are optionally energizable to illuminate the can top at an oblique angle relative to the Z axis, and wherein the rotary table means includes insert means for receiving the peripheral edge of a can top adjacent the reference surface in the rotary table.

9. A method for making precision measurements of a plurality of parameters of a can top as the can top is being inspected, comprising the steps of:
(a) affixing the can top to a working area surface, said working area surface residing on a movable stage;
(b) translating the movable stage in either or both of a first direction and a second direction, the first direction being orthogonal to the second direction, the first direction defining an "X" axis and the second direction defining a "Y" axis, said translation being controlled by processor generated instructions so as to achieve a first desired orientation of the can top;
(c) rotating the movable stage through an angular displacement, said angular displacement defining a direction O, said rotation being controlled by processor generated instructions so as to achieve a second desired orientation of the can top;
(d) generating an electronic signal image of the can top by video camera means, the video camera means being translatable in a third direction, said third direction being mutually orthogonal to both the first direction and the second direction, the third direction defining a "Z" axis;
(e) analyzing the image of the can top, thereby providing measurements of the can top, the analysis supplying information to the processor so as to assist in the generation of instructions in controlling the translation and rotation of the movable stage; and
(f) measuring the "Z" axis dimensions of the can top by scanning the opposite sides of the can top concurrently.

10. The method of making precision measurements of claim 9 wherein the scanning step comprises directing light beams obliquely toward the can top, said light beams impinging opposite sides of the can top sensing, said light beams after said impingement, said sensing of each beam occurring in each of two orthogonal directions.

11. The method of making precision measurements of claim 10 further comprising scanning at least one score line on the can top in a direction transverse to the score line which is scanned, the direction of scanning being achieved by rotating the movable stage to a selected angular position.

12. The method of making precision measurements of claim 11 further comprising the steps of:
(a) varying the position of the video camera means along the "Z" axis;
(b) autofocusing the camera means as a result of said varying of the camera position; and
(c) sensing the camera position when the auto focusing has been achieved, thereby permitting height of a surface feature on the can top to be measured.

13. The method of making precision measurements of claim 12, further comprising the step of measuring the surface features on the can top in relation to an upper reference surface of the movable stage.

14. The method of making precision measurements of claim 13, further comprising the step of illuminating the working area surface coaxially with the "Z" axis and optionally illuminating the can top at an oblique angle relative to the "Z" axis.

15. A system for determining the score residual thickness in a can top during a phase of the fabrication thereof comprising:
means for holding the can top in a predetermined reference plane;
first and second light beam range sensing means disposed on opposite sides of the reference plane each including light source means directing a light beam at an angle other than normal to the direction of the reference plane and two dimensional sensor means disposed in the path of a beam reflected off the can top, the relative positions of the sources being known;
analyzer means responsive to the positions of the beams reflected on to the sensor means for calculating the score residual thickness from the reflections off opposite sides of the can tops and the known source positions; and
means for providing relative movement between the can top in the reference plane and the range sensing means such that the score line is scanned in a direction substantially perpendicular to the direction of the score in the scanning position.

16. The system as set forth in claim 15 above, wherein the sensor means comprise multi-element light sensor arrays having a long Y axis dimension and a relatively shorter X axis dimension and wherein the analyzer means comprises means for locating the center of the score residual from variations of the reflected light beam off the X axis centroid.

17. The system as set forth in claim 16 above, wherein the light source means comprise laser beam sources and the sensor arrays comprise CCD arrays, and wherein the light beams are directed toward the can top at angles of approximately 45° and have a beam size of approximately 0.4 mil diameter.

18. A system for receiving and controlling the position of can tops for analysis by an electronic system, along different axes comprising:
   rotatable spindle means disposed concentric with a vertical axis;
   turntable means coupled to the rotatable spindle means and disposed along a horizontal plane, the turntable means including a plurality of means for receiving individual can tops in angularly separated positions in the horizontal plane;
   drive means coupled to the spindle means for rotating the turntable means to different angular positions.

19. A system as set forth in claim 18 above, wherein the turntable means comprises a planar element having a number of circumferentially separated circular through apertures located at a common radial distance and including a central aperture and substantially flat upper and lower surfaces, and means for attaching the planar element in noninverted or inverted position.

20. A system as set forth in claim 19 above, further including precision inserts for receiving can tops in the through apertures, the inserts comprising rings having radially inwardly directed tabs a spaced apart regions on the periphery and including adjacent shoulders spaced apart radii, the shoulders including means to receive and retain a can top, the principal inside radius of a ring being greater than the outer radius of an inserted can top.

21. A system for positioning and examining objects to be analyzed by a machine vision system in three dimensions, comprising:
   X axis positioning means disposed to be movable along a first predetermined horizontal axis;
   Y axis positioning means disposed to be movable along a second predetermined horizontal axis normal to and below the first;
   rotatable object support means positioned on a superior position of the Y axis positioning means and bearing a number of the objects to be examined;
   Z axis positioning means coupled to the X axis positioning means and including camera means movable therewith; and
   differential range measurement means including sensors spaced apart along the Z axis coupled to the Z axis positioning means, whereby an object to be examined that is on the object support means can be transported between the sensors in the differential range measurement means in a selected angular orientation within a selectable range of positions along the X,Y and Z axis.

22. The invention as set forth in claim 21 above, wherein the rotatable object support means comprises substantially planar turntable means having a number of pockets disposed therein for receiving objects to be examined, and means for rotating the turntable means to selected angular positions.

23. The invention as set forth in claim 22 above, wherein the turntable means includes means for securing the turntable means in normal or inverted position on the Y axis positioning means, and wherein the system further comprises insert means individually receivable within the pockets and including reference surfaces for retaining the objects to be examined.

24. The invention as set forth in claim 23 above, wherein the objects to be examined comprise can tops at selected stages of formation.

25. The invention as set forth in claim 24 above, wherein the system further comprises X,Y and Z axis position sensors individually coupled to the X,Y and Z axis positioning means respectively, and means responsive to the differential range measurement means for calculating the thickness of an object transported between the sensors.

26. A method for determining the thickness of material beneath a scored region of a surface, comprising the steps of:
   (a) securing the surface such that the surface is oriented in a predetermined reference plane;
   (b) emitting a first and second beam of light at the reference plane, the beam of light impinging the surface at a nonorthogonal angle relative to the reference plane, the first and second beams of light emanating from known positions relative to the reference plane;
   (c) sensing the first and second beams of light, the sensing occurring after each beam of light has been reflected from the surface, the sensing occurring at known positions relative to the reference plane;
   (d) moving the surface relative to the first and second light beams such that the first and second light beams scan the scored region of the surface in a direction substantially perpendicular to a score line residing with the scored region of the surface; and
   (e) analyzing the position of the sensed reflected first and second beam of light, thereby calculating the thickness of material beneath the scored region based on the known positions of the emitted and reflected light beams.

27. The method for determining the thickness of a material of claim 26, further comprising the steps of:
   (a) sensing the first and second beam of light in a first and second dimension, the first dimension defining an "X" axis and the second dimension defining a "Y" axis; and
   (b) analyzing the sensed reflected first and second light beams by determining deviation of each light beam from the "X" axis and the "Y" axis, the analysis permitting calculation of a centerline of the scoreline being scanned.

28. The method for determining the thickness of a material of claim 27 wherein the emitted first and second beams of light are generated by laser, the emitted light beams being sensed by charge coupled device arrays, the emitted light beams being directed toward the surface at an angle of approximately 45° relative to the reference plane, each emitted light beam being approximately 0.4 mils in diameter.

29. The method for determining the thickness of a material of claim 28, further comprising the step of:
   sensing the reflected light beams along the centerline of the scoreline, thereby averaging any irregularities within the scoreline so as to measure the material thickness with an accuracy of at least 0.060 mils.

30. A method for measuring the thickness of material remaining beneath a score line on a surface, comprising the steps of:
   (a) emitting a first laser beam toward a first side of the surface, the emitted laser beam impinging the surface at an angle of approximately 45°, the emitted laser beam traveling in a direction substantially parallel to the scoreline at the point of the emitted laser beam impingement, the scoreline residing on the first side of the surface;

(b) emitting a second laser beam toward a second side of the surface, the emitted laser beam impinging the surface at an angle of approximately 45°, the emitted laser beam traveling in a direction substantially parallel to the scoreline at the point of the emitted laser beam impingement;

(c) sensing the first laser beam after the first laser beam is reflected from the first surface, the sensing providing a first range measurement "R1";

(d) sensing the second laser beam after the second laser beam is reflected from the second surface, the sensing providing a second range measurement "R2";

(e) determining a calibration constant "K" by measuring a surface of known thickness with the first and second laser beam emission where "K" is derived by adding "R1" and "R2" for the surface of known thickness;

(f) calculating the thickness of the material remaining beneath the score line by solving the equation:

thickness = K−R1−R2.

31. A method for determining the location of the scoreline appearing on the surface of a material, comprising the steps of:

(a) directing a laser generated beam at the surface of the material, the beam impinging the surface at an oblique angle so as to create an illuminated spot on the surface;

(b) translating the laser generated beam across the scoreline in a direction substantially perpendicular to the scoreline;

(c) tracking the illuminated area as the illuminated area translates across the scoreline, the illuminated area tending to periodically deviate in a first direction parallel to the scoreline and to periodically deviate in a second direction parallel to the scoreline, the second direction being opposite to the first direction; and (d) locating a centerpoint position during the translation of the beam across the scoreline, the centerpoint position residing within the scoreline in a region where the illuminated spot has substantially no deviation as the spot transitions from a maximum deviation in the first parallel direction to a maximum deviation in the second direction, the centerpoint position defining a point on the centerline of the scoreline.

* * * * *